US006276760B1

(12) United States Patent
Everett

(10) Patent No.: US 6,276,760 B1
(45) Date of Patent: Aug. 21, 2001

(54) QUICK RELEASE HUB FOR CYCLE WHEEL

(76) Inventor: Richard C. Everett, 225 Sunshine La., West Linn, OR (US) 97068

( * ) Notice: Subject to any disclaimer, the term of this patent is extended or adjusted under 35 U.S.C. 154(b) by 0 days.

(21) Appl. No.: 09/342,032

(22) Filed: Jun. 28, 1999

(51) Int. Cl.$^7$ .......................... B60B 35/00; B60B 37/00; B62B 7/00; B62B 9/00; B62M 1/14

(52) U.S. Cl. .................................. 301/124.2; 280/242.1; 280/250.1; 280/647; 280/47.38

(58) Field of Search .............................. 301/111, 124.2 I, 301/125, 114, 115; 280/242.1, 250.1, 647, 47.38, 639

(56) References Cited

U.S. PATENT DOCUMENTS

| | | | |
|---|---|---|---|
| 4,400,038 | * 8/1983 | Hosokawa | 301/111 |
| 5,060,962 | * 10/1991 | McWethy | 280/250.1 |
| 5,165,762 | * 11/1992 | Phillips | 301/111 |
| 5,653,512 | * 8/1997 | Phillips | 301/124.2 |
| 5,662,345 | * 9/1997 | Kiewit | 280/250.1 |
| 5,673,925 | * 10/1997 | Stewart | 301/124.2 |
| 5,695,212 | * 12/1997 | Hinkston | 301/111 |
| 5,791,672 | * 8/1998 | Masclet | 280/250.1 |
| 5,961,186 | * 10/1999 | Phillips | 301/124.2 |

* cited by examiner

Primary Examiner—S. Joseph Morano
Assistant Examiner—Jason R. Bellinger
(74) Attorney, Agent, or Firm—Edwards E. Roberts

(57) ABSTRACT

A quick release hub assembly having an elongate hollow axle for receiving thereon a captively held rotatable wheel. For attachment and release, the assembly is provided with an insert mechanism, which fits within a tubular opening on a vehicle. The assembly includes an elongate rod threaded at one end and having a pivotable cam member and handle on the other end. A cam follower washer member is positioned on the rod between the handle and the wheel. The insert mechanism includes first and second cone members in facing relation with a split nylon ring in between the two facing cone surfaces. The cone members are received on the rod and are held in place thereon between the wheel and the threaded end by means of a locking nut. The parts are dimensioned and configured such that movement of the rod in the axial direction outwardly on pivoting of the handle toward the wheel urges the cone surfaces together thus moving the perimeter of the split nylon ring radially outwardly against the inner surface of the tubular opening to thereby lock the hub assembly in place relative to the vehicle. Conversely, pivoting of the handle away from the wheel moves the rod axially inwards to thereby relax the pressure on the nylon washer and permit ready release of the assembly. The cam handle is pivotable about a pivot axis parallel to the plane of the wheel and moves through an angle away from the plane of the wheel to apply (or relax) an axial force to the assembly for securing or release of the assembly.

15 Claims, 4 Drawing Sheets

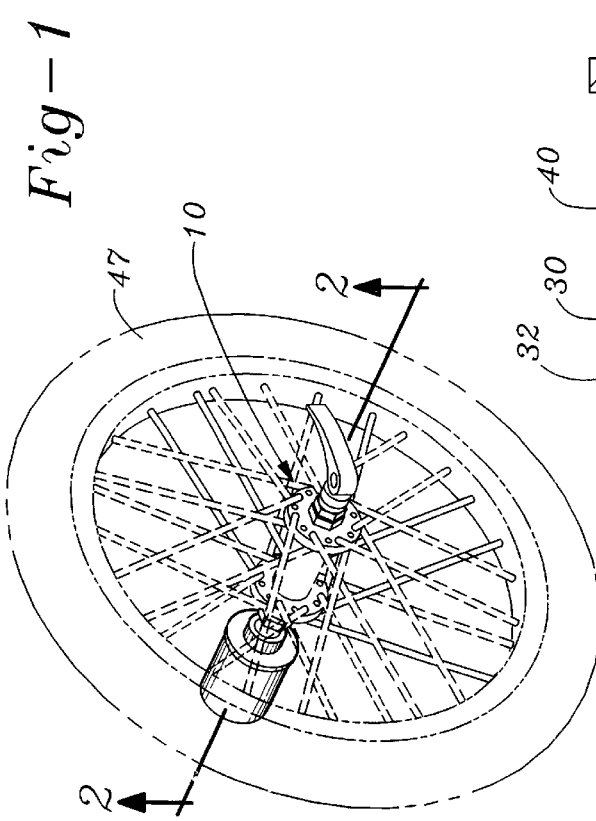
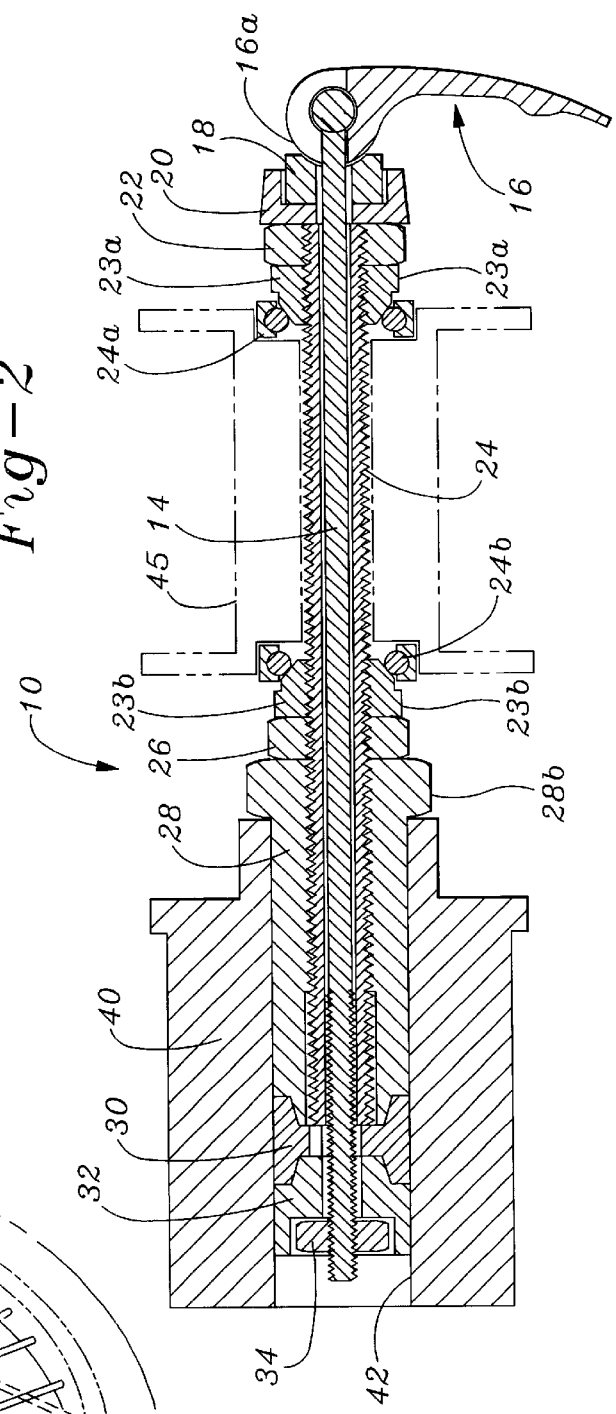

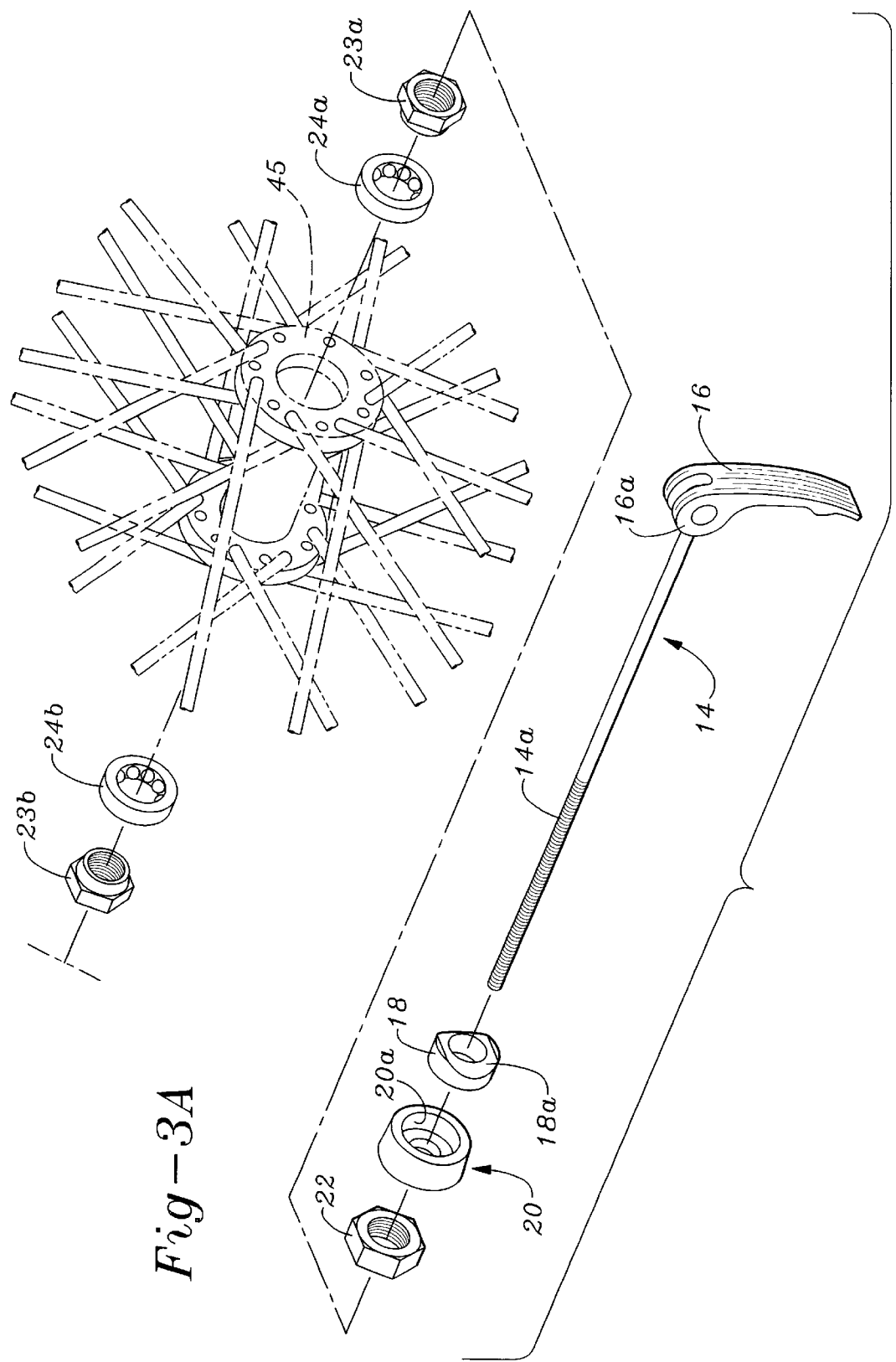

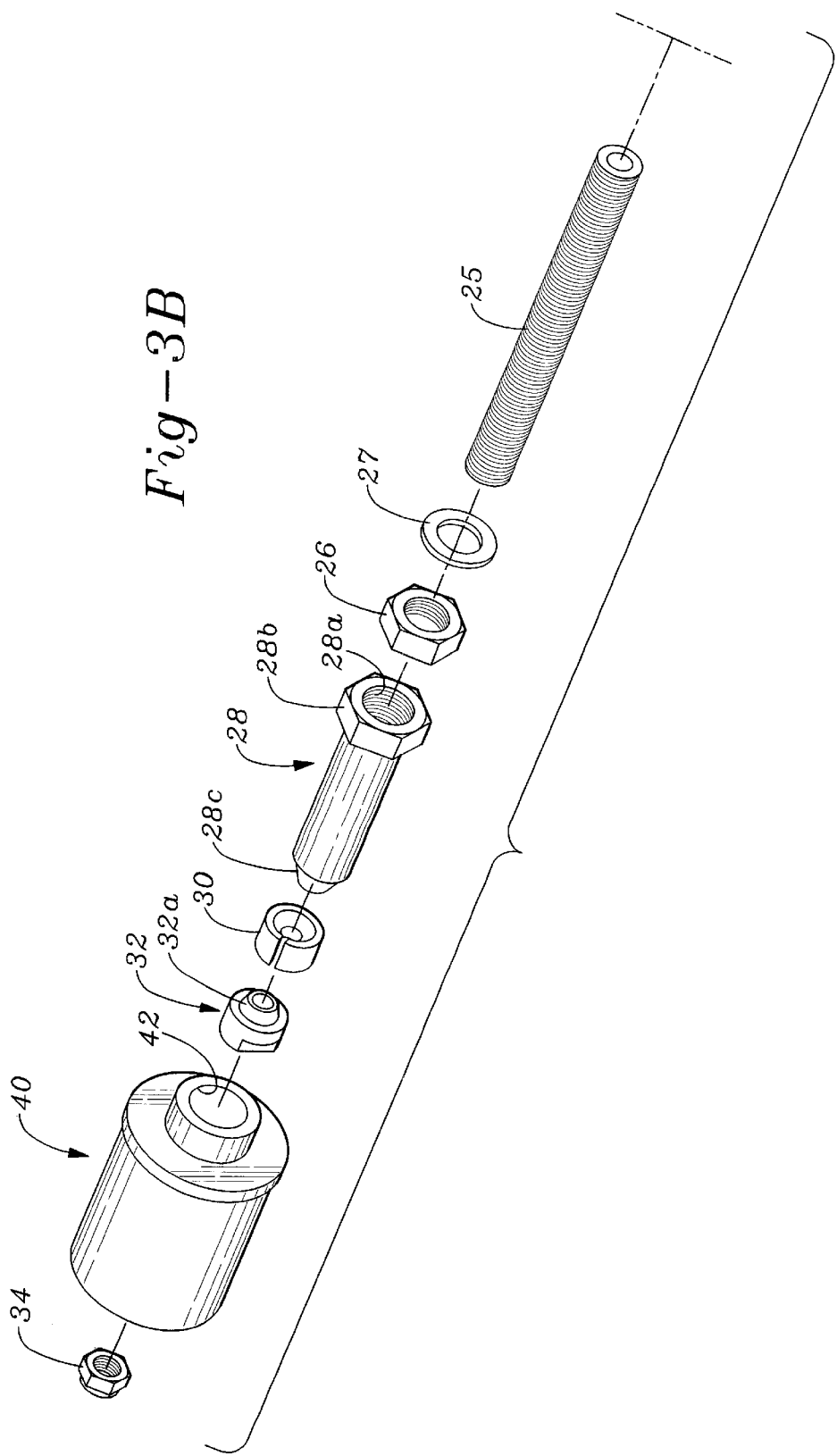

QUICK RELEASE HUB FOR CYCLE WHEEL

BACKGROUND OF THE INVENTION

The background of the invention will be discussed in two parts.

1. Field of the Invention

This invention relates to hub assemblies, and more particularly to a quick release hub assembly for a wheel, which may be utilized for a bicycle, jogging stroller, or the like.

2. Description of the Prior Art

Jogging strollers have become prevalent for young persons with children. Such vehicles enable a parent to exercise while minding one or more children in the stroller. In addition, for the bicycle crowd, other accessory devices have become common, such as trailers suitably configured for hauling behind a bicycle. For such devices such as strollers and trailers, one of the necessary characteristics required by a consumer or user is the feature of collapsibility, preferably expeditious collapsibility without the use of tools. One of the major considerations is the removal of the one or more wheels of the bicycle accessory device in a timely manner without tools. Wheels used for such devices are normally bicycle type wheels, that is, spoked wheels with pneumatic bicycle tires.

So-called ten-speed bicycles and the like are provided with releasable hubs for the front and, sometimes, rear wheels. A bicycle wheel assembly for such a front wheel includes an axle bolt threaded at both ends for passing through the wheel hub opening with bearing caps threaded to both ends after the bearings are in place with the wheel. This assembly is attached by the axle being placed between the slotted openings of the forks and end nuts suitably affixed to the ends of the axle bolt. For a quick release, generally at least one of the end nuts has been enlarged and provided as a cap nut with a pivotable handle having the pivot axis passing through the cap to provide a lever for enabling tightening and loosening of the wheel hub assembly without tools. The lever essentially acts as a captive wrench handle. One of the main disadvantages of such a cap nut is that the rotation of the rather short handle oftentimes resulting in bruised knuckles due to the proximity of the handle to the spokes and forks of the bike.

With jogging strollers and bicycle trailers, the construction is ordinarily of tubular aluminum, and the wheel attachment means are provided at the ends of such tubes. In accordance with an aspect of the invention, there is provided a quick release hub assembly utilizing cam action for assembly and disassembly of a wheel within an opening at the end of a tubular member on a vehicle, such as a jogging stroller, a bicycle trailer, or the like.

SUMMARY OF THE INVENTION

In accordance with the invention there is provided a quick release hub assembly having an elongate hollow axle for receiving thereon a captively held rotatable wheel. For attachment and release, the assembly is provided with an insert mechanism, which fits within a tubular opening on a vehicle. The assembly includes an elongate rod threaded at one end and having a pivotable cam member and handle on the other end. A cam follower washer member is positioned on the rod between the handle and the wheel. The insert mechanism includes first and second cone members in facing relation with a split nylon ring inbetween the two facing cone surfaces. The cone members are received on the rod and are held in place thereon between the wheel and the threaded end by means of a locking nut.

The parts are dimensioned and configured such that movement of the rod in the axial direction outwardly on pivoting of the handle toward the wheel urges the cone surfaces together thus moving the perimeter of the split nylon ring radially outwardly against the inner surface of the tubular opening to thereby lock the hub assembly in place relative to the vehicle. Pivoting of the handle away from the wheel moves the rod axially inwards to thereby relax the pressure on the nylon washer and permit ready release of the assembly. The cam handle is pivotable about a pivot axis parallel to the plane of the wheel and moves through an angle away from the plane of the wheel to apply (or relax) an axial force to the assembly for securing or release of the assembly.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1 presents a perspective view of a vehicle mount end cap and the quick release hub assembly according to the invention affixed to a bicycle type wheel shown in broken lines;

FIG. 2 is a cross-sectional view of the vehicle mount end cap and hub assembly taken along line 2—2 of FIG. 1:

FIGS. 3A and 3B present exploded perspective views of the vehicle mount end cap and the quick release hub assembly according to the invention.

DESCRIPTION OF THE PREFERRED EMBODIMENT

Figure 4:
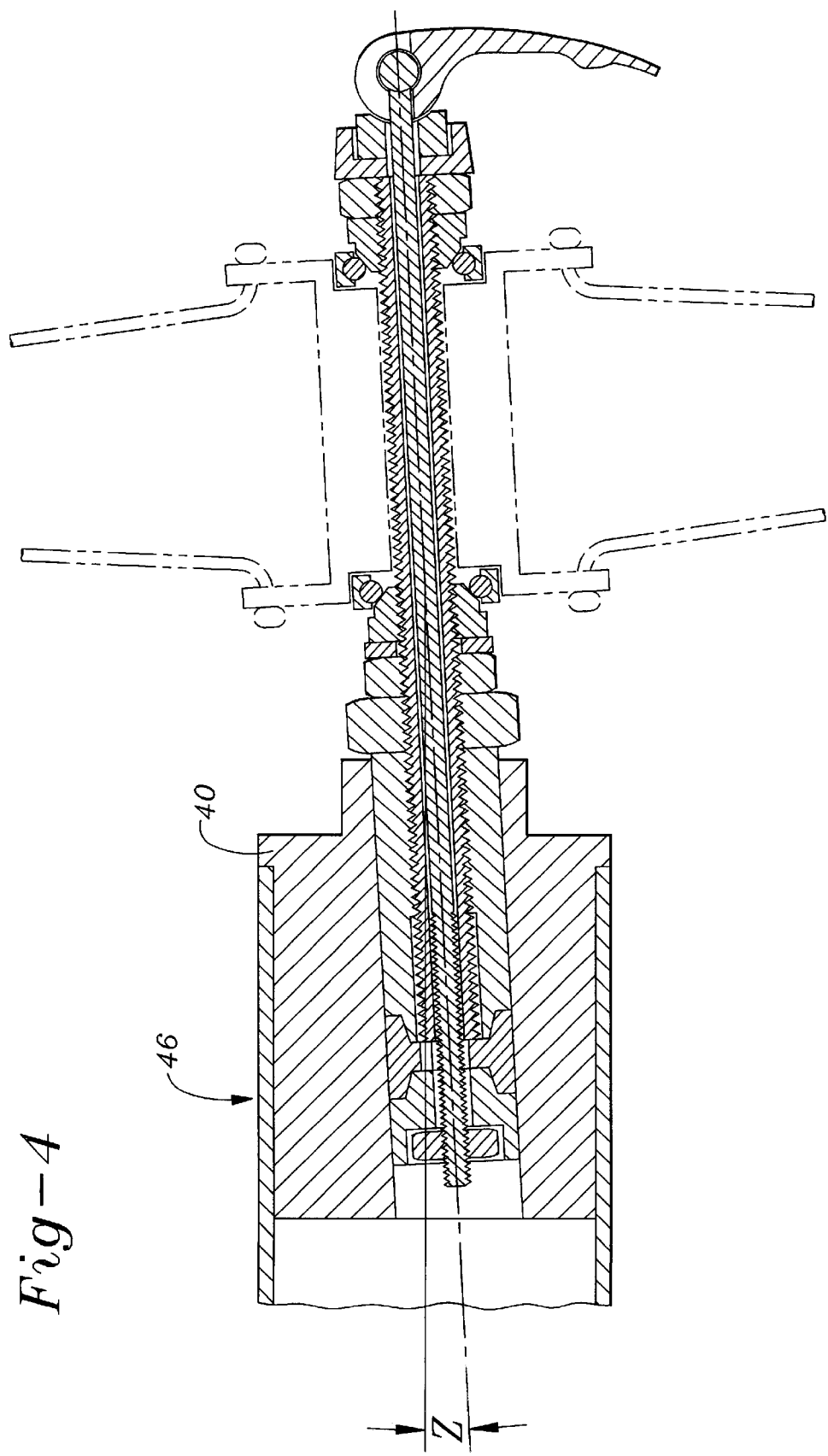
FIG. 4 is a cross sectional view of the vehicle mount end cap and hub assembly showing configuration thereof for canting of the wheel from the vertical.

Referring now to the drawings, and particularly to FIGS. 1, 2, 3A and 3B, there is shown the components of the quick release hub assembly, generally designated 10 for attachment within an axial opening 42 of a tubular portion 46 of a vehicle, as will be further explained hereinbelow. Briefly, by reference to FIG. 2, and more specifically to exploded views 3A and 3B, the components of the quick release hub assembly include an longate skewer or rod 14, threaded at least at one end 14a and having a cammed handle 16 pivotably attached at the other end.

Next in order is a cam follower washer 18, made of plastic or Nylon material, which is formed with a concave cam follower surface 18a for abutting engagement with the cam lobe 16a of the handle 16. The washer 18 is received within a recess 20a of an appropriately dimensioned spacer washer 20. A first nut 22 is provided for threadably attaching to one end of a hollow shaft or axle 25, which is shown as threaded along its entire length, although it need not be. Since there is no threaded attachment to wheel hub 45 (shown in dotted lines in FIG. 2), all that is required is an appropriate threaded portion at both ends of axle 25. As seen in FIG. 2 the wheel hub 45 is mounted for rotation on axle 25 and securely positioned by placement nuts 23a and 23b against ball bearings 24a and 24b. Nut 22 is threaded on axle 24 and as will be explained, in the "secured" or mounted position of the wheel 45, nut 22 abuts spacer washer 20 to provide that with operation of cam lobe 16a contact is established between cam follower surface 18a, space washer 20, and nut 22, to retract rod 14 through axle 24 thereby providing that hub assembly 10 is secured within axial opening 42.

Next in order is a second nut 26 which as shown in FIG. 3b is threadably received on axle 25 and tightened to abut placement nut 23b on the other side of wheel 45. Spacer washer 27 between nut 26 and placement nut 23b if needed. Then, an elongate shaft cone 28, which is provided with an axially extending opening 28a, is threaded onto axle 24. Shaft cone 28 is provided with an enlarged dimensioned portion, shown as nut head 28b, which forms a shoulder for insertion of the shaft cone 28 into the opening 42 of end cap 40. Depending upon alignment considerations, in some instances nut 26 and washer 27 are not used and shaft cone 28 is threaded and tightened to abut placement nut 23b. When so attached, the nut 26 acts like a "jam" nut, that is, it is tightened against the adjacent surface of the shaft cone 28.

A split nylon washer 30 is then provided for being received over the rod 14 along with a second short shaft cone 32, the pieces then being retained on the rod 14 by a lock nut 34 which is threaded on the end 14a of the rod 14. The shaft cones 28 and 32 have tapered faces 28c and 32a in the axial direction, with the faces 28c and 32a facing each other as shown in FIGS. 2 and 3b. Correspondingly, the nylon split washer 30 has opposite surfaces thereof formed with concavities to match the faces 28c and 32a. The end cap 40, as well as the shaft cones 28 and 32 are typically formed of machined aluminum.

As shown more particularly in FIGS. 1, 2 and 4, the assembly 10, including end cap 40, supports a spoked wheel 47 (FIG. 1) by means of the wheel hub 45 which is rotatably mounted on the axle 24 and captively held thereon by means of nuts 23a and 23b. Referring particularly FIGS. 2 and 4, the end cap 40 is forcibly mounted within an axial opening of a tubular portion 46 of the vehicle, be it a jogging stroller or a bicycle trailer, or the like. It can be press fit, welded or fastener attached within the tubular portion 46. The shaft cones 28 and 32 along with the split nylon ring 30 form an insert mechanism for the hub assembly 10, which is inserted within the fitting, such as end cap 40, which is an enlarged drum like member with an axially extending opening 42, which has an inner diameter slightly greater than the outer diameter of the shaft cones 28 and 32.

In operation, by reference primarily to FIG. 2, the large shaft cone 28 is provided with an enlarged dimension nut head 28a which forms a shoulder for insertion into the opening 42, that is, the insert mechanism is fully installed when the nut head 28a abuts against the end of the opening 42. Dimensionally, the axial lengths of the rod 14, the shaft cones 28, 32 and the width of the nylon split ring 30 are such that, with the handle 16 in its "secured" position, and the lock nut threaded to the proper position, the components are as shown with little or no space between the cone faces 28c and 32a relative to the abutted concave surfaces of the split ring 30.

The "secured" position of the handle is as shown in FIG. 2 with the long axis of the handle in a plane generally at a right angle the axis of the axle 25, or generally parallel to the plane of the wheel 40. At this position, the split ring 30 is forced radially outwardly into tight frictional engagement with the inner wall of the opening 42 of the end cap 40. This effectively causes the split ring 30 to act as a brake shoe.

In the "release" position, the handle is pivoted counterclockwise through an angle of about 90 degrees, at which point the cam lobe 16a is displaced from the cam follower washer 18. At this juncture, the resilience of the split ring 30 causes it to return to its original condition, that is, radially inwards, until the frictional engagement with the inner wall of opening 42 is released, thus enabling the hub assembly to be removed from the opening 42 in the end cap 40. With the handle 16 pivoting about an axis parallel to the plane of the wheel 45, bruised and scraped knuckles are minimized, if not eliminated.

As indicated in FIG. 4, the wheel 44 may be canted from the vertical through a desired angle "Z" by providing that opening 42 be angled in end cap 40 such that a canted orientation, with respect to its rolling surface, is provided to the wheel. That is, the center line of said opening 43 is at an angle to the center line of said tubular portion 46.

In accordance with the preferred embodiment, there has been described a quick release hub assembly of relative simplicity for enabling rapid attachment and release of a wheel from a vehicle such as a jogging stroller or bicycle trailer. While there has been shown and described a preferred embodiment, other adaptations and modifications may be made without departing from the spirit and scope of the invention.

What is claimed is:

1. A quick release hub assembly for a wheel adapted for mounting to a vehicle having a tubular opening, said assembly comprising:

an elongate hollow axle for receiving thereon a captively held rotatable wheel;

an insert mechanism for placement within said tubular opening, said insert mechanism being attached, at least in part, to said axle, said insert mechanism including a radially expanding and contracting friction member;

an elongate rod extending through said hollow axle and having one end in interoperative relationship with said insert mechanism;

cam means coacting with the other end of said rod for effecting axial movement of said rod within said hollow axle; and means within said insert mechanism operative in response to said axial movement of said rod to cause radial expansion and contraction of said friction member into and out of frictional engagement with the inner wall of said tubular opening, as desired, for enabling attachment and removal of said hub assembly mechanism and a wheel thereon.

2. The quick release hub assembly of claim 1 wherein said tubular opening is configured to receive said insert mechanism in a manner to provide canting of said wheel from the vertical.

3. The quick release hub assembly of claim 2 wherein the center line of said tubular opening is offset at an angle to the center line of said insert mechanism.

4. The quick release hub assembly of claim 1 wherein said means within said friction member is a split ring.

5. The quick release hub assembly of claim 1 wherein said insert mechanism further includes first and second shaft cones inserted within said fitting, and tightening means for selectively positioning and containing said friction member between said first and second shaft cones.

6. The quick release hub assembly of claim 5 wherein said first shaft cone includes a shoulder abutting the entrance of said tubular opening for restrictive insertion of said first shaft cone, and whereby the tightening of said tightening means cooperates with said shoulder to maintain desired contact between inner faces of said shaft cones and said expansion and contraction means.

7. The quick release hub assembly of claim 6 wherein said expansion and contraction means is a split ring and said tightening means is a lock nut.

8. A quick release hub assembly for a wheel adapted for mounting to a vehicle having a tubular opening, said assembly comprising:
- an elongate hollow axle for receiving thereon a captively held rotatable wheel;
- an insert mechanism for placement within said tubular opening, said insert mechanism being attached, at least in part, to said axle and including friction means for engagement with the inner wall of said tubular opening;
- an elongate rod extending through said hollow axle and having one end in interoperative relationship with said insert mechanism; and
- cam means coacting with the other end of said rod for effecting axial movement of said rod to thereby cause radial expansion and contraction of said friction member into and out of engagement with the inner wall of said tubular opening for enabling attachment and removal of said hub assembly mechanism and a wheel thereon.

9. The quick release hub assembly of claim 8 wherein said insert mechanism further includes a first and second shaft cones inserted within said tubular opening, said first shaft cone having a shoulder abutting the entrance of said tubular opening for restrictive insertion of said first shaft cone, and tightening means for selectively positioning and securing said friction member between said first and second shaft cones.

10. The quick release hub assembly of claim 9 wherein said friction means is a split ring and said tightening means is a lock nut.

11. A quick release hub assembly for a wheel adapted for mounting to a vehicle having a tubular opening, said assembly comprising:
- an elongate hollow axle for receiving thereon a captively held rotatable wheel;
- an insert mechanism for placement within said tubular opening, said insert mechanism being attached, at least in part, to said axle and including friction means for selective engagement and disengagement with the inner wall of said tubular opening;
- operative means coacting with said insert mechanism to effect expansion and contraction of said frictional means for enabling attachment and removal of said hub assembly mechanism and a wheel thereon.

12. The quick release hub assembly of claim 11 wherein said friction means is a split ring.

13. The quick release hub assembly of claim 11 further including an elongate rod extending through said hollow axle and having one end thereof in interoperative relationship with said insert mechanism, and cam means coacting with the other end of said rod for effecting axial movement of said rod to thereby cause radial expansion and contraction of said friction means.

14. The quick release hub assembly of claim 13 further including first and second shaft cones inserted within said tubular opening, said first shaft cone having a shoulder abutting the entrance of said tubular opening for restrictive insertion of said first shaft cone, and locking means for selectively positioning and securing said friction means between said first and second shaft cones.

15. The quick release hub assembly of claim 14 wherein said friction means is a split ring and said locking means is a lock nut.

* * * * *